United States Patent
Akeda

(12) 
(10) Patent No.: US 6,643,073 B1
(45) Date of Patent: Nov. 4, 2003

(54) DEVICE FOR DRIVING OBJECT LENS

(75) Inventor: Yoshio Akeda, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,699

(22) PCT Filed: Aug. 17, 1999

(86) PCT No.: PCT/JP99/04423
§ 371 (c)(1),
(2), (4) Date: Jun. 27, 2001

(87) PCT Pub. No.: WO01/13368
PCT Pub. Date: Feb. 22, 2001

(30) Foreign Application Priority Data

Feb. 18, 1998 (JP) ............................. 10-035586

(51) Int. Cl.[7] .............................. G02B 15/14; G02B 7/02
(52) U.S. Cl. ..................... 359/696; 359/814; 359/824; 369/44.26
(58) Field of Search .................. 359/813, 814, 359/824, 696, 698; 369/44.26

(56) References Cited

U.S. PATENT DOCUMENTS

| | | | |
|---|---|---|---|
| 5,187,702 A | * | 2/1993 | Takahashi .................. 369/215 |
| 5,541,777 A | * | 7/1996 | Sakamoto et al. ........... 359/824 |
| 5,592,459 A | * | 1/1997 | Kasahara ................. 369/44.21 |
| 5,627,687 A | * | 5/1997 | Fujisawa .................... 359/823 |
| 5,719,834 A | * | 2/1998 | Futagawa et al. ......... 369/44.14 |

FOREIGN PATENT DOCUMENTS

| | | |
|---|---|---|
| JP | 60-173727 | 9/1985 |
| JP | 3-100934 | 4/1991 |
| JP | 5-217188 | 8/1993 |
| JP | 8-20315 | * 8/1996 |
| JP | 10-69668 | 3/1998 |
| JP | 11-232671 | 8/1999 |

* cited by examiner

*Primary Examiner*—Huy Mai
(74) *Attorney, Agent, or Firm*—Wenderoth, Lind & Ponack L.L.P.

(57) ABSTRACT

There is provided an objective lens drive for driving an objective lens to optically read information recorded on a rotative driven disc. An objective lens holding member (2) is held by four first metal wires (61) on a relay holding member (71), and the relay holding member (71) is held by four second metal wires (62) on a fixing part (72). The acceleration sensitivity which acts on the objective holding member (2) in different disc rotation frequency bands is increased. The disc rotation frequency bands correspond to different resonance frequency bands created by each of a first free oscillation system, the main part of which is the first metal wires (61), and a second free oscillation system, the main part of which is the second metal wires (62). Thereby, the light spot's following sensitivity to the displacement of an information recording, track can be increased in at least two disc rotation frequency bands.

11 Claims, 4 Drawing Sheets

DEVICE FOR DRIVING OBJECT LENS

BACKGROUND OF THE INVENTION

1. Technical Field

The present invention relates to an objective lens drive for driving an objective lens to optically read information recorded on a rotative driven disc recording medium in a focusing direction which is parallel to an optical axis of the objective lens and in a tracking direction which is perpendicular to the optical axis.

2. Description of Related Art

As one of a supporting means for supporting an objective lens holding member in an objective lens drive which is used in an information reproduction apparatus for optically reading information recorded on a rotative driven disc recording medium, there is provided a cantilever supporting arrangement in which, for example, four metal wires are employed wherein one of the respective ends of each of the metal wires is fixed to the objective lens holding member, and each of the other respective ends thereof is fixed to a fixing part. In this cantilever supporting arrangement, a first resonance frequency of the objective lens drive is determined by the movable body mass of the objective lens drive, which includes the objective lens holding member, and mainly by the spring constants of the metal wires.

In this first resonance frequency band, the driving sensitivity to the force current supplied to the objective lens drive increases remarkably. Therefore, by designing the objective lens drive such that the first resonance frequency band generally coincides with a rotation frequency band of the recording medium, it becomes easy to ensure the acceleration required for following the displacement of the focusing direction and the tracking direction of an information recording track due to the rotation of the recording medium. Thereby, focusing the servo performance and the tracking servo performance, which are required for the reading of optical information in the information reproduction apparatus, can be ensured.

In recent years, in a CD-ROM reproduction apparatus, the speed-up of data transfer, such as four times the speed, eight times the speed, and sixteen times the speed, has been promoted against the standard transfer speed of recording information which is conventionally used in music program reproduction or the like, and these speeds have occupied the mainstream of the CD-ROM reproduction apparatus market. The speed-up of the data transfer as described above is performed by increasing the rotational speed of the disc as an information recording medium. The acceleration sensitivity, which is necessary when a light spot which is generated by the objective lens under this rotational speed is to exactly follow the displacement of the information track of the disc, is required from the objective lens drive of an optical pickup which is in charge of reading information.

In order to satisfy this requirement, the first resonance frequency is increased in accordance with an increase in the rotational speed of the disc in the conventional objective lens drive. Thereby, the conventional objective lens drive has been designed so as to obtain the maximum level of the acceleration sensitivity in the disc rotation frequency band in which the maximum displacement of the information track is generated in the focusing direction and in the tracking direction.

However, in the conventional objective lens drive, the first resonance frequency held by the objective lens drive is increased in accordance with the increase in the rotational speed of the disc, which causes a speed-up of the data transfer This results in lowering the acceleration sensitivity when the light spot generated by the objective lens follows the displacement of the information recording track in the disc rotation frequency band close to a DC band. Therefore, there has been a problem in that the operation performance under the standard data transfer speed, which is applied to music reproduction or the like as the standard function of the CD-ROM reproduction apparatus, is interfered with.

Accordingly, the present invention is made to solve these problems, and has for its object to provide an objective lens drive which can improve the light spot's following sensitivity to the displacement of the information recording track in at least two disc rotation frequency bands.

SUMMARY OF THE INVENTION

An objective lens drive according to the present invention comprises: an objective lens holding member which holds an objective lens; a focusing coil for generating a driving force in a focusing direction that is parallel to an optical axis of the objective lens, and a tracking coil for generating a driving force in a tracking direction that is perpendicular to the optical axis of the objective lens, which are respectively wound on the peripheral part of the holding member; four first metal wires arranged so that a first end of each of the first metal wires is fixed to the objective lens holding member, and a second end of each of the first metal wires is fixed to a relay holding member; four second metal wires arranged so that a first end of each of the second metal wires is fixed to the relay holding member, and a second end of each of the second metal wires is fixed to a fixing part; and magnetic circuit members which are arranged in the fixing part so as to form the magnetic field for generating the driving force based on the Lorenzo force by supplying current to the focusing coil and the tracking coil through the first metal wires and the second metal wires, wherein the objective lens holding member is supported by the relay holding member so as to be movable in accordance with the elastic deformation of the first metal wires, and the relay holding member is supported by the fixing part so as to be movable in accordance with the elastic deformation of the second metal wires.

Accordingly, two free oscillation systems are formed. That is, a first free oscillation system is formed by the summation of the mass of the members such as the objective lens holding member, which is supported so as to be movable in accordance with the elastic deformation of the first metal wires, and spring constants of the first metal wires 61; and a second free oscillation system is formed by the summation of the mass of the members such as the objective lens holding member and the relay member, which is held on the relay holding member by four second metal wires on the fixing part and are supported so as to be movable in accordance with the elastic deformation of the second metal wires, and spring constants of four second metal wires.

The resonance phenomena which are inherent in the second free oscillation system are caused in a band lower than the resonance frequency caused by the first free oscillation system by optimizing the mass of these component members and the spring constants of the metal wires. Consequently, the acceleration sensitivity which acts on the objective lens holding member in the objective lens drive is increased in each band of the resonance frequency caused by the first free oscillation system and the resonance frequency caused by the second free oscillation system. The resonance frequency which is inherent in the first free oscillation system is generally equal to a high-speed disc rotation frequency for high-speed data transfer, thereby improving the light spot's ability to follow the displacement of the information recording track. In addition, the light spot's ability to follow the displacement of the information recording track in the disc rotation frequency band at the standard data transfer speed is improved by the resonance frequency generated in the second free oscillation system. Therefore, the light spot's following sensitivity to the displacement of the information recording track can be increased in at least two disc rotation frequency bands.

DETAILED DESCRIPTION OF THE INVENTION

Figure 1:
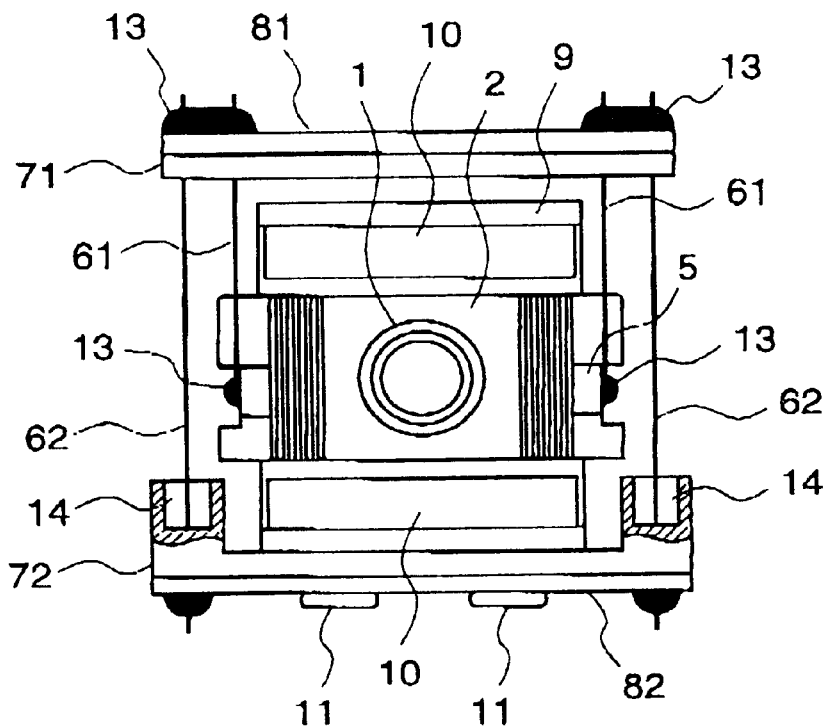
FIG. 1 is a top view of an objective lens drive according to the present invention.
Figure 2:
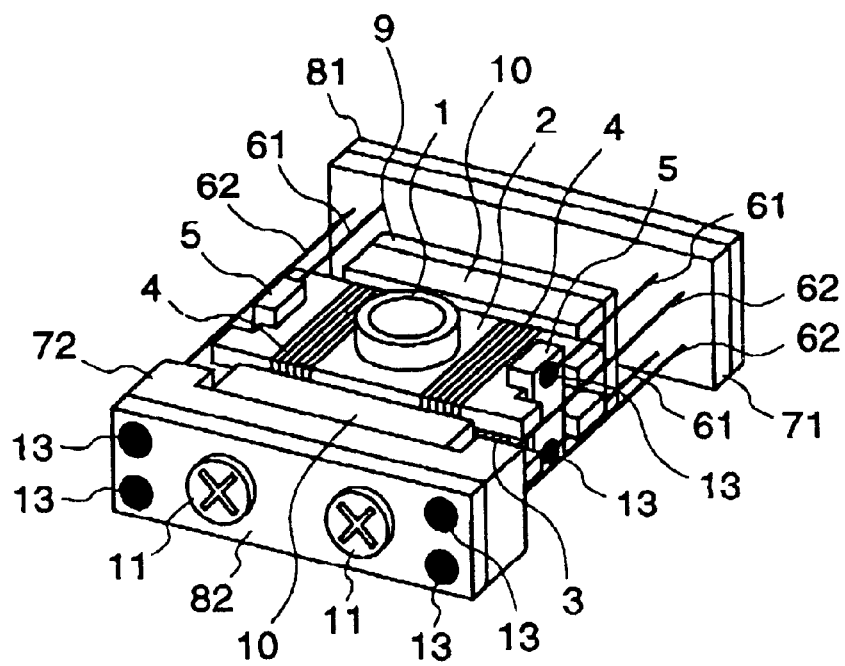
FIG. 2 is a perspective view of the objective lens drive according to the present invention.

Hereinafter, the best mode for carrying out the present invention will be described by taking the objective lens drive of the optical pickup used in the CD-ROM reproduction apparatus as an example, with reference to the drawings. In FIGS. 1 and 2, a focusing coil 3 for generating the driving force in a focusing direction parallel to the optical axis of the objective lens 1, and a tracking coil 4 for generating the driving force in a tracking direction perpendicular to the optical axis of the objective lens are wound on the periphery of an objective lens holding member 2, which holds the objective lens 1. A printed board 5 is fixed on both sides of the objective lens holding member 2. First ends of the four first metal wires are fixedly connected to respective terminals of the focusing coil 3 and the tracking coil 4 by solder 13 through the printed board 5, thereby creating electrical continuity between these ends and these terminals. At the same time, second ends of the four first metal wires 61 are fixedly connected by solder 13 to the printed board 81, which is fixed on a relay support block 71, thereby creating electrical continuity between these second ends and the printed board 81.

That is, the objective lens holding member 2 is supported by the relay support block 71 so as to be movable in accordance with the elastic deformation of the four first metal wires 61. In addition, the first ends of the four second metal wires are fixedly connected to the printed board 81 which is fixed on the relay support block 71, thereby creating electrical continuity between the first metal wires 61 and the printed board 81. At the same time, the second ends of the second metal wires 62 are fixedly connected by solder 13 to the printed board 89, which is fixed on the fixing support block 72 by a screw 11, thereby creating electrical continuity between these ends and the printed board 82. A damming material 14 comprising silicon or the like for stopping oscillation is mounted in a part of the fixing support block 72 where the second metal wires 62 are fixed. In addition, the fixing support block 72 is fixed to a fixing part such as an apparatus base.

That is, the relay support block 71 is supported by the fixing part so as to be movable in accordance with the elastic deformation of the four second metal wires 62 which are parallel to the first metal wires 61. Numeral 10 denotes magnets which are fixed so as to be opposed to a magnetic yoke 9 fixed on the fixing part while having a predetermined gap between the focusing coil 3 and the tracking coil 4. A magnetic circuit member is constituted by these magnets 10 and the magnetic yoke 9. These magnets 10 form the magnetic field for generating the driving force based on the Lorenzo force in the focusing coil 3 and the tracking coil 4 by the predetermined driving current supplied through the first metal wires 61 and the second metal wires 62. Thereby, the movement of the objective lens holding member 2 in the focusing direction, which is parallel to the optical axis of the objective lens 1, and in the tracking direction, which is perpendicular to the optical axis, can be obtained in accordance with the current supply to the focusing coil 3 and the tracking coil 4, and thus focusing servo and tracking servo operations can be performed.

Figure 3:
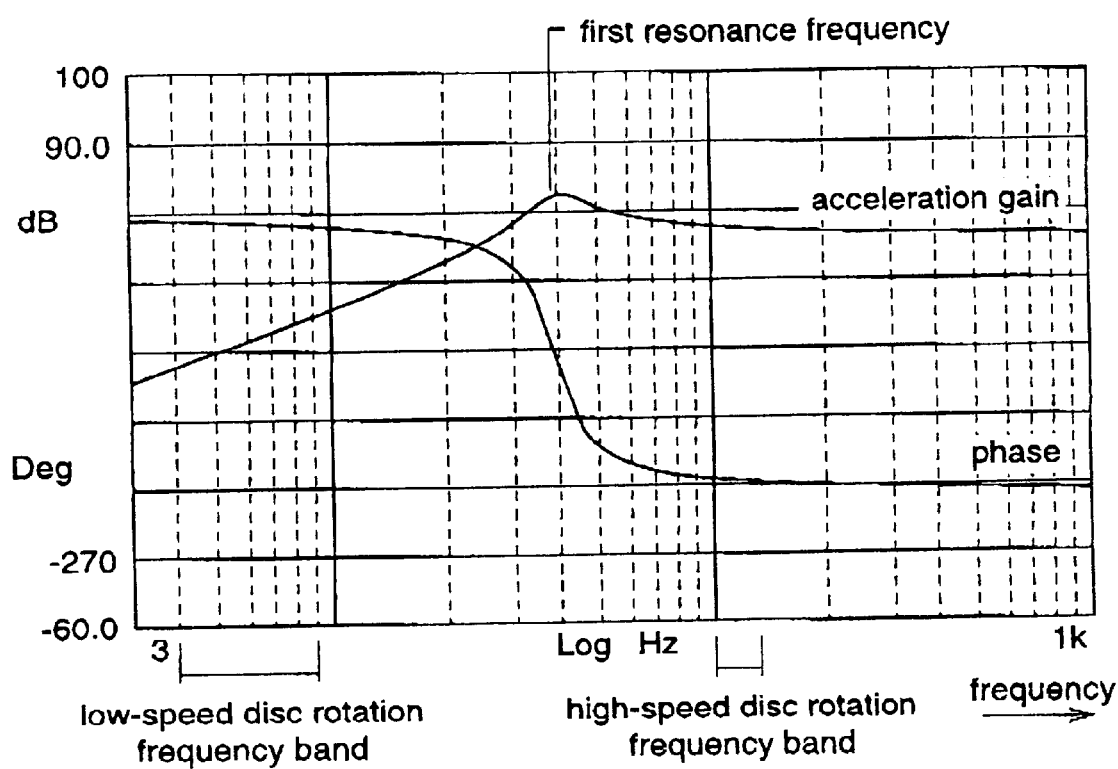
FIG. 3 is a diagram showing an example of acceleration frequency characteristics of a conventional objective lens drive.
Figure 4:
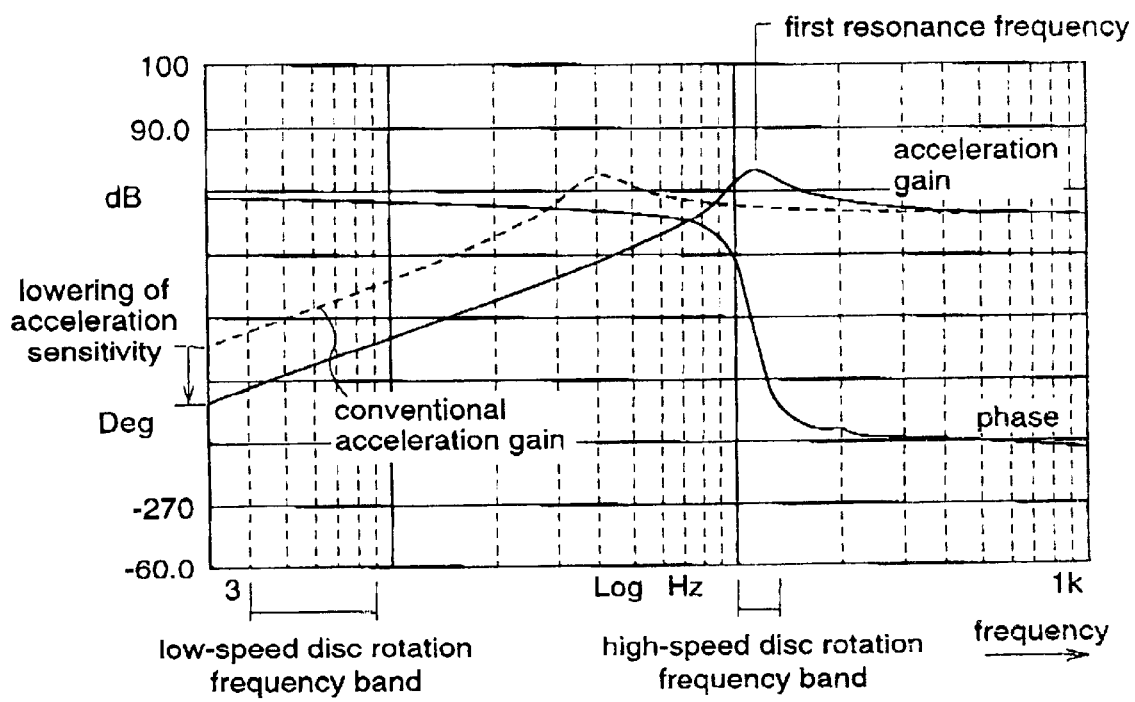
FIG. 4 is a diagram showing an example of acceleration frequency characteristics of the conventional objective lens drive corresponding to the speed-up of the data transfer by an increase in the first resonance frequency.

FIG. 3 shows acceleration frequency characteristics seen in the conventionally used objective lens drive. According to this figure, the remarkable increase in the acceleration gain can be seen in the first resonance frequency band. This frequency band is made generally equal to the disc rotation frequency band, thereby raising the light spot's following sensitivity to the displacement of the information recording track in the objective lens drive. Furthermore, when the disc rotation frequency is increased for the purpose of the speed-up of the data transfer, the following sensitivity in the necessary frequency band can be raised by taking measures in which the first resonance frequency of the objective lens drive is increased as shown in FIG. 4. However, the acceleration gain in the frequency band close to the DC band decreases in inverse proportion to the square of the increasing amount of the frequency together with the increase in the first resonance frequency. Therefore, the acceleration gain therein may cause a lowering of the following sensitivity of the light spot to the displacement of the information recording track.

Figure 5:
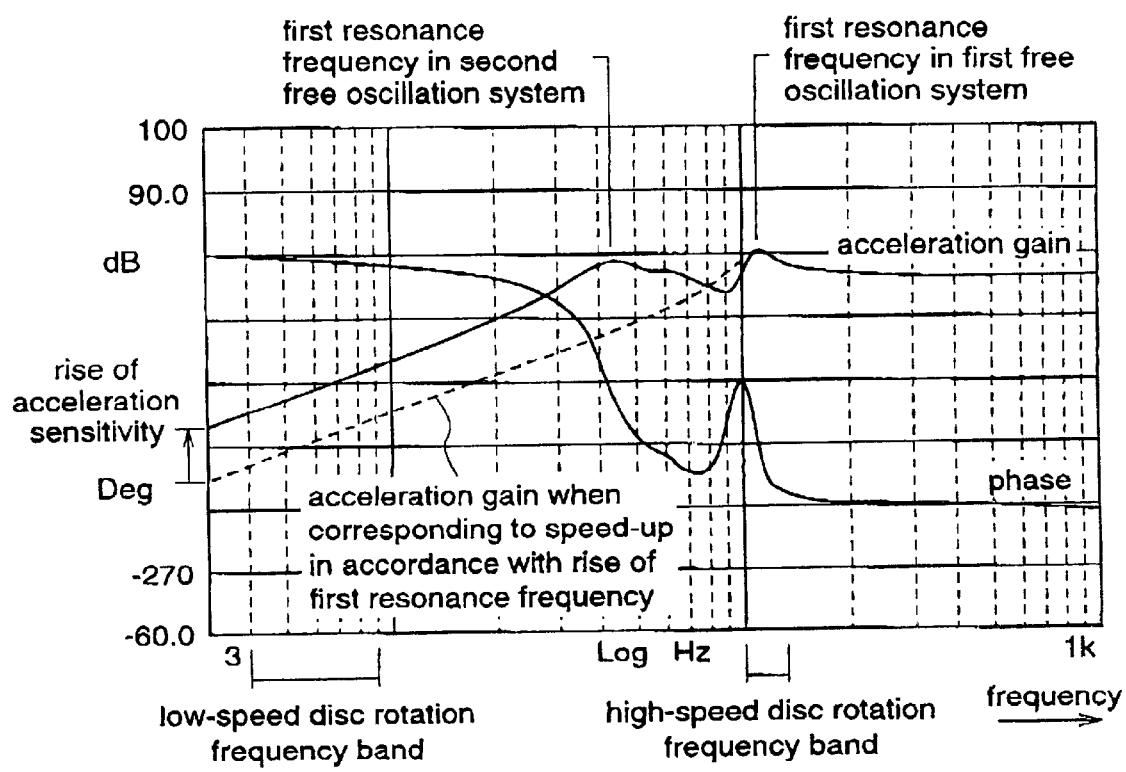
FIG. 5 is a diagram showing an example of acceleration frequency characteristics of the objective lens drive according to the present invention.

Here, in the best mode for carrying out the present invention, two sets of metal wires in sets of four are used as supporting means of the objective lens holding member 2 as described above. The first ends of the first metal wires 61 in one set are fixed to the objective lens holding member 2, and the second ends of the first metal wires are fixed to the relay support member 71. The first metal wires in the set of metal wires constitute a first free oscillation system based on the summation of the mass of the members which are supported by the first metal wires 61 and the spring constants of the first metal wires 61. The first ends of the second metal wires 62 in another set are fixed to the relay support member 71, and the second ends of the second metal wires are fixed to the fixing part. The second metal wires in another set constitute a second free oscillation system based on the summation of the mass of the members which are supported by the second metal wires 62 and the spring constants of the second metal wires 62. Then, the acceleration gain which acts on the objective lens holding member 2 is increased in both of the first resonance frequency band, which is inherent in the first free oscillation system, and the lower first resonance frequency band, which is inherent in the second free oscillation system, as shown in FIG. 5, by optimizing the mass of the respective component members and the spring constants of the metal wires 61 and 62.

As described above, two sets of free oscillation systems using two sets of metal wires 61 and 62 in sets of foul as the supporting means of the objective lens holding member 2 are formed. The resonance frequency which is inherent in the first free oscillation system is made generally equal to a high-speed rotation frequency band of the disc, the object of which is the high-speed data transfer, which thereby results in increasing the acceleration which acts on the objective lens holding member 2 in the high-speed disc rotation frequency band. In addition, tile resonance phenomena which are inherent in the second free oscillation system are caused in the frequency band lower than the resonance frequency which is inherent in the first free oscillation system. Thereby, the acceleration in the low-speed disc rotation frequency band which is applied to the music reproduction or the like using the CD-ROM reproduction apparatus is increased more than the acceleration applied only to the first free oscillation system. Therefore, the light spot's following sensitivity to the displacement of the information recording track can be increased in both of the high-speed disc rotation frequency band, the object of which is the high-speed data transfer, and the low-speed disc rotation frequency band which is applied to the music reproduction or the like.

Industrial Availability

The objective lens drive according to the present invention is useful as a drive which drives the objective lens in the optical pickup for optically reading information recorded on a rotative driven disc recording medium. More particularly, it is suitable for being used in an optical information recording/reproduction apparatus corresponding to the transferring speed of two or more pieces of recording information, such as a CD-ROM reproduction apparatus.

What is claimed is:

1. An objective lens drive comprising:
   an objective lens holding member arranged to hold an objective lens so as to define an optical axis;
   a focusing coil wound around a peripheral part of said objective lens holding member, said
   a focusing coil being operable to generate a driving force in a focusing direction parallel to the optical axis;
   a tracking coil wound around a peripheral part of said objective lens holding member, said tracking coil being operable to generate a driving force in a tracking direction perpendicular to the optical axis;
   a relay holding member;
   a fixing part;
   four first metal wires arranged so that a first end of each of said first metal wires is fixed to said objective lens holding member and a second end of each of said first metal wires is fixed to said relay holding member;
   four second metal wires arranged so that a first end of each of said second metal wires is fixed to said relay holding member and a second end of each of said second metal wires is fixed to said fixing part;
   magnetic circuit members arranged in said fixing part, said magnetic circuit members being operable to form a magnetic field to generate a driving force based on the Lorenzo force by supplying current to said focusing coil and said tracking coil through said first metal wires and said second metal wires,
   wherein said objective lens holding member is supported by said relay holding member so as to be movable in accordance with an elastic deformation of said first metal wires, and said relay holding member is supported by said fixing part so as to be movable in accordance with an elastic deformation of said second metal wires.

2. The objective lens drive according to claim 1, wherein said objective lens holding member is arranged between said relay holding member and said fixing part.

3. The objective lens drive according to claim 1, wherein a first pair of said first metal wires and a first pair of said second metal wires are arranged on a first side of said objective lens holding member, and a second pair of said first metal wires and a second pair of said second metal wires are arranged on a second side of said objective lens holding member opposite said first side.

4. The objective lens drive according to claim 1, further comprising printed boards fixed on respective sides of said objective lens holding member, said first metal wires being fixed to said printed boards.

5. The objective lens drive according to claim 4, wherein said first end of each of said first metal wires is fixed to a terminal of said focusing coil and a terminal of said tracking coil through one of said printed boards fixed on respective sides of said objective lens holding member.

6. The objective lens drive according to claim 1, further comprising a damping material for stopping oscillation, said damming material being mounted in said fixing part where said second end of each of said second metal wires is fixed to said fixing part.

7. The objective lens drive according to claim 1, wherein said magnetic circuit member comprises a magnet and a magnetic yoke which opposes said magnet, said magnet being arranged in said fixing part and spaced away from said focusing coil and said tracking coil.

8. The objective lens drive according to claim 1, wherein a printed board is fixed to said relay holding member.

9. The objective lens drive according to claim 8, wherein said second end of each of said first metal wires is fixed to said printed board that is fixed to said relay holding member.

10. The objective lens drive according to claim 1, wherein a printed board is fixed to said fixing part.

11. The objective lens drive according to claim 10, wherein said second end of each of said second metal wires is fixed to said printed board that is fixed to said fixing part so as to provide electrical continuity between said second end of each of said second metal wires and said printed board that is fixed to said fixing part.

* * * * *